United States Patent [19]

Kunkel et al.

[11] 4,027,932

[45] June 7, 1977

[54] CLUTCH RELEASE BEARING

[75] Inventors: Heinrich Kunkel, Schweinfurt;
Manfred Brandenstein, Aschfeld;
Armin Olschewski, Schweinfurt;
Sigismund Finzel, Dittelbrunn; Willi Gossmann, Niederwerrn; Peter Horling, Mainberg, all of Germany

[73] Assignee: SKF Industrial Trading and Development Company B.V., Nieuwegein, Netherlands

[22] Filed: May 20, 1975

[21] Appl. No.: 579,266

[30] Foreign Application Priority Data

May 25, 1974 Germany ......................... 2425351

[52] U.S. Cl. .................... 308/233; 192/45; 192/110 B
[51] Int. Cl.² ......................................... F16C 19/00
[58] Field of Search ............... 308/233, 219, 9, 35, 308/184 R, 189; 192/98, 45, 110 B, 113 R

[56] References Cited

UNITED STATES PATENTS

| 2,673,768 | 3/1954 | Douglas | 308/233 |
|---|---|---|---|
| 3,792,911 | 2/1974 | Huber et al. | 308/233 |

Primary Examiner—Joseph F. Peters, Jr.
Assistant Examiner—Richard A. Bertsch
Attorney, Agent, or Firm—Daniel M. Rosen

[57] ABSTRACT

A clutch release bearing including cooperative inner and outer race rings with included rolling elements, and a holding ring having a first flange closely adjacent and facing a second flange of one of said rings, one of said two flanges having spiral grooves or other means for providing with a fluid hydraulic pressure between said flanges, thereby urging said inner and outer race rings together for maintaining a generally fixed axial relationship between them.

9 Claims, 7 Drawing Figures

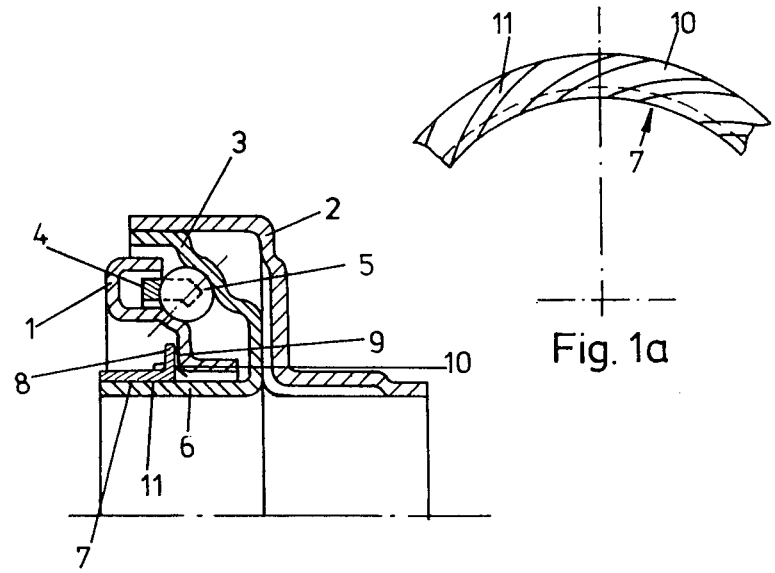
Fig. 1
Fig. 1a
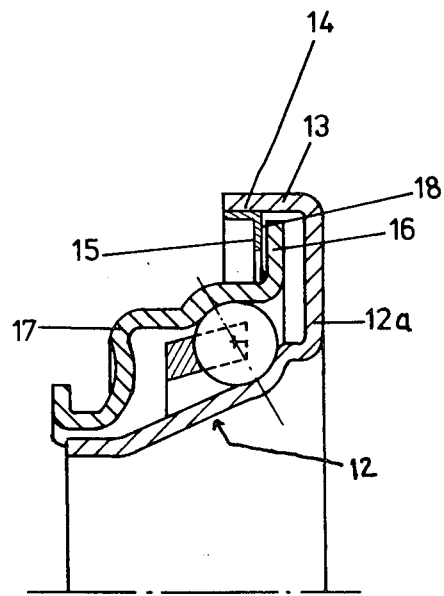
Fig. 2

U.S. Patent  June 7, 1977  Sheet 2 of 2  4,027,932
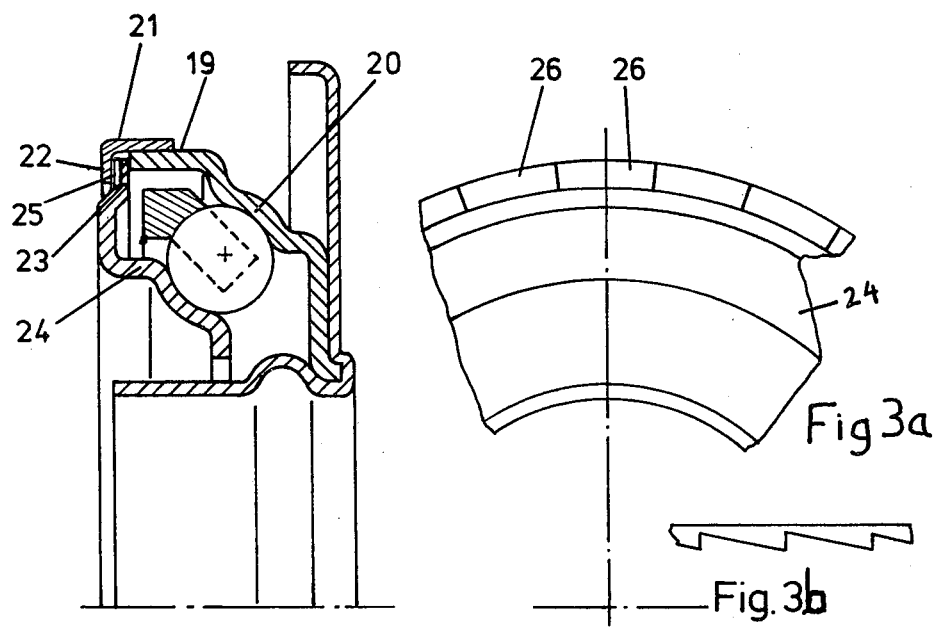
Fig. 3
Fig. 3a
Fig. 3b
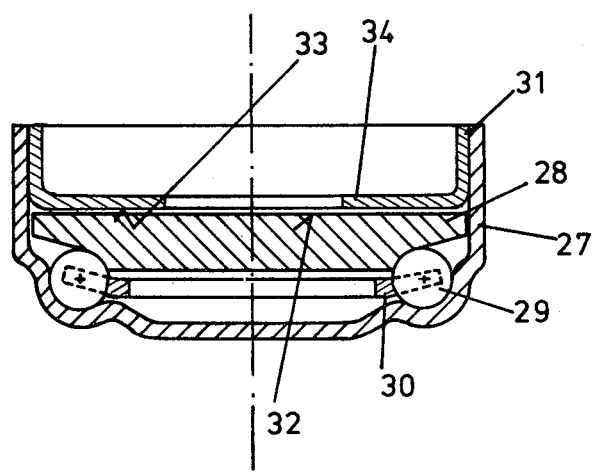
Fig. 4

CLUTCH RELEASE BEARING

BACKGROUND OF THE INVENTION

This invention relates to a clutch release bearing which includes two bearing races, rolling elements arranged between the races and preferably held by a retainer, as well as a holding ring attached to one of the bearing races, the holding ring joining the two races and the rolling elements to constitute an assembly.

Clutch release bearings of this general type are already known in the art, as illustrated by FIG. 3 of the German Utility Model Pat. U.S. No. 1,975,536 which discloses a clutch release bearing having first and second bearing races made of sheet metal, where the two bearing races are held together by means of an angle ring forced onto an axial projection of one of the bearing rings. This angle ring has a radial flange which faces a corresponding radially oriented surface of the second bearing ring; this angle ring performs merely a holding function in view of the fact that there exists a relatively large axial space between the mutually opposing surfaces of the angle ring and the second bearing race.

Another prior art clutch release bearing, as disclosed in the German Patent Specification No. 2,211,521, is a thrust bearing in which the angle ring inserted into the bore of the outer bearing disk connects with its radially oriented flange the inner bearing disk with the set of rolling elements so as to constitute one component or assembly. Likewise in this case the angle ring performs merely a holding function.

In the case of intermittent operation of known clutch release bearings, there is the risk, during the released state of the bearing, that the set of rolling elements may push the two bearing rings axially apart so that the set of rolling elements would sag, thereby causing the likelihood of an radial shift between the individual bearing components, which impairs the operation of the bearing.

It is the object of the present invention to create a clutch release bearing of the type described above in which, without any additional elements, an axial displacement of the bearing ring parts is prevented at any time during operation.

SUMMARY OF THE INVENTION

In accordance with the present invention, the above object is achieved in that the holding ring constitutes a hydrodynamic thrust bearing operable with the front area of the adjacent bearing ring facing the holding ring.

In another embodiment of the invention, it is proposed to provide one of the mutually opposite, radially oriented surfaces of the holding ring and of the adjacent bearing ring with self-pressure generating grooves, e.g., spiral grooves, or else to provide them with lubricating pockets distributed over the circumference.

The resulting design provides a plain bearing between the mutually opposing surfaces of the holding ring and the adjacent bearing race, with a lubricating film generated from the lubricant situated between said mutually facing surfaces, which forces the two bearing rings of the clutch release bearing against one another in any operating condition, thereby making it possible to prevent the above-mentioned displacement between the bearing rings and the set of rolling elements, and associated drawbacks.

Further particulars of the invention are illustrated with reference to the annexed drawings of preferred embodiments.

BRIEF DESCRIPTION OF THE DRAWINGS

FIG. 1 is a cross-sectional view of a clutch release bearing in accordance with the invention, designed as a radial bearing, FIG. 1a is a partial plan view of the angle ring provided with spiral grooves of FIG. 1, FIGS. 2 and 3 are cross-sectional views of further embodiments of radial bearings in accordance with the invention, FIG. 3a is a partial plan view of the inner race of the bearing with the holding ring removed, FIG. 3b is a partial elevation view of the wedges in FIG. 3a, and FIG. 4 is a cross-sectional view of a clutch release bearing in accordance with the invention, designed as a thrust bearing.

DETAILED DESCRIPTION OF THE PREFERRED EMBODIMENTS

The new bearing in accordance with FIG. 1 consists of an inner race 1, an outer race 3 fitted into a housing 2, and balls 5 arranged inside a retainer 4 between the two bearing races 1 and 3. For the purpose of connecting the two bearing races with the set of balls or roller elements so as to constitute an assembly, an angle ring 7 is forced onto an axially projecting cylindrical portion 6 of the outer race 3, i.e., mounted on said portion 6 and fixed axially by a press fit; this angle ring has a flange 8 extending radially outward and facing a corresponding surface 9 extending radially outward from the inner race 1, with resulting prevention of the bearing components from deteriorating. The front area 10 of the radial flange 8 of the angle ring 7 facing the radial flange 9 of the inner race 1 of the bearing is, in accordance with the invention, provided with spiral grooves 11 (see FIG. 1a). These spiral grooves are arranged in such a way that, as a result of the lubricant present inside the gap between the radial flange 8 and the radial section 9 of the inner race 1, a pressure is built up that forces the bearing race 1 against the rolling elements 5 and, thereby, against the bearing race 3. In this way it is assured that the set of rolling elements, that is to say, the retainer 4 with its balls 5 will not sag, i.e., there will be no radial shift likely to impair the operability of the bearing.

FIG. 2 illustrates another clutch release bearing with sheet metal bearing races. The inner race 12 has a radial section 12a, with an adjacent axial sleeve section 13. Into the bore of this sleeve-shaped section 13 there is inserted and axially fixed an angle ring 14 whose radially inwardly oriented flange 15 faces a radially outwardly oriented flange 16 of the outer ring 17. The front area 18 of the radial flange 15 of the angle ring 14 facing the flange 16, is provided with spiral grooves similar to the embodiment of FIG. 1.

In the embodiment illustrated in FIG. 3, an angle ring 21 is fitted and axially fixed onto the cylindrical section 19 of the outer race ring 20, which engages by means of a radially inwardly directed flange 22, the radially outwardly oriented flange 23 of the inner race 24. In this embodiment, the front area 25 of the radial flange 23 of the inner race 24, which faces the radial flange 22, is provided with wedge-shaped pockets 26. The angle ring 21 is forced to such an extent onto the cylindrical portion 19 of the outer ring 20, that there is formed only a slight gap between the mutually opposing surfaces of the flanges 22 and 23. The wedge-shaped pockets 26 are designed to generate a lubricating film and, thereby, to separate the metallic contact areas.

FIG. 4 illustrates a clutch release bearing designed as a thrust bearing. Bearings of this type are preferably required for clutches arranged between an engine and a gear, and in which the cup spring of the clutch can be actuated by an axially displaceable plunger. The bearing has a pot-shaped outer bearing disk 27, an inner bearing disk 28 made of solid material, as well as the rolling elements 29 arranged on the races in the two disks. The rolling elements 29 are mounted inside a retainer 30. The two bearing disks 27 and 28 are axially positioned by means of an angle ring 31 forced into the bore of and axially fixed on the bearing disk 27, whose surface 33 of the radial flange 34, facing the front side 32 of the inner bearing disk 28, is provided with spiral grooves in accordance with the invention.

The invention is not limited to the illustrated embodiments described above. Thus, in lieu of the bearing races generally described in the above-mentioned embodiments as made of sheet metal, one can obviously use also those made of solid material. The holding rings can likewise be designed to have a different shape. The arrangement of the spiral grooves or of the lubrication pockets can be designed to exist in the corresponding surfaces of the holding ring as well as in those of the bearing ring situated opposite thereto.

What is claimed is:

1. In a clutch release bearing operable with a lubricant and including inner and outer rings, rolling elements arranged therebetween, and a holding ring mounted to a first of the bearing rings and holding the two bearing rings and the rolling elements together as an assembly, the improvement comprising a radial flange on said second of said bearing rings and said holding ring comprising a hydrodynamic thrust bearing, said holding ring having a second radial flange closely adjacent said first radial flange, said flanges having facing surfaces, and means for developing, during relative rotation of said surfaces, hydraulic pressure in said lubricant between said surfaces urging same apart and urging said bearing rings together in a direction for preventing radial displacement therebetween.

2. A bearing according to claim 1, wherein one of said facing surfaces is provided with self-pressure generating spiral grooves.

3. A bearing according to claim 1, wherein one of said facing surfaces is provided with circumferentially distributed lubricating pockets.

4. In a bearing assembly operable with a lubricant and including inner and outer race rings coaxial about the bearing axis, and a plurality of rolling elements situated between the axially spaced races of these rings, the improvement in combination therewith of a holding member for maintaining said rings and rolling elements together as an assembly, said holding member secured to a first of said race rings, said holding member and said second of said rings each having a flange extending generally radially relative to said axis, said two flanges having closely adjacent facing surfaces, and at least one of said surfaces comprises means for developing hydrodynamic pressure in said lubricant when said lubricant is between said surfaces and one of said surfaces is rotated relative to the other, said pressure urging said surfaces axially apart, whereby said first and second race rings are urged axially toward each other for preventing radial displacement therebetween.

5. A bearing according to claim 4, wherein said means for developing hydraulic pressure comprises at least one spiral groove in said surface.

6. A bearing according to claim 4, wherein said spiral groove is in the holding member flange.

7. A bearing according to claim 4, wherein said spiral groove is in said inner ring flange.

8. A bearing according to claim 4, wherein said means for developing hydraulic pressure comprises a plurality of wedge-shaped pockets circumferentially distributed on one of said surfaces, whereby during relative rotational movement of said surfaces lubricant in said pockets becomes compressed.

9. A bearing according to claim 8, wherein said pockets each define a space of increasing volume in a direction of rotational motion of the surface containing said pockets.

* * * * *

UNITED STATES PATENT AND TRADEMARK OFFICE
CERTIFICATE OF CORRECTION

PATENT NO. : 4,027,932

DATED : June 7, 1977

INVENTOR(S) : Heinrich Kunkel, et al

It is certified that error appears in the above-identified patent and that said Letters Patent are hereby corrected as shown below:

Column 2, line 63 after "22," insert --behind--.

Column 3 line 33 after "and outer" insert --bearing--.

Signed and Sealed this

Fourth Day of October 1977

[SEAL]

Attest:

RUTH C. MASON
Attesting Officer

LUTRELLE F. PARKER
Acting Commissioner of Patents and Trademarks